(12) United States Patent
Maeda et al.

(10) Patent No.: US 8,296,026 B2
(45) Date of Patent: Oct. 23, 2012

(54) POWERTRAIN CONTROL APPARATUS AND METHOD, AND PROGRAM FOR IMPLEMENTING THE CONTROL METHOD

(75) Inventors: Yasuhiro Maeda, Toyota (JP);
Hideharu Nohara, Okazaki (JP);
Toshinari Suzuki, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 903 days.

(21) Appl. No.: 11/987,657

(22) Filed: Dec. 3, 2007

(65) Prior Publication Data
US 2008/0288145 A1    Nov. 20, 2008

(30) Foreign Application Priority Data
Dec. 25, 2006  (JP) ................................. 2006-348218

(51) Int. Cl.
*G06F 19/00*   (2006.01)
(52) U.S. Cl. ................ 701/67; 701/51; 701/54; 701/57; 701/68
(58) Field of Classification Search .................... 701/51, 701/53; 477/115; 123/679
See application file for complete search history.

(56) References Cited

U.S. PATENT DOCUMENTS

| | | | |
|---|---|---|---|
| 4,487,303 A * | 12/1984 | Boueri et al. | 477/86 |
| 4,512,212 A | 4/1985 | Ishikawa | |
| 4,680,959 A * | 7/1987 | Henry et al. | 73/115.02 |
| 5,016,175 A | 5/1991 | Baltusis et al. | |
| 5,161,432 A | 11/1992 | Matsumoto et al. | |
| 5,166,879 A | 11/1992 | Greene et al. | |
| 5,396,420 A * | 3/1995 | Graf | 701/55 |
| 5,609,537 A | 3/1997 | Mochizuki et al. | |
| 5,672,138 A | 9/1997 | Mikami et al. | |
| 5,887,670 A * | 3/1999 | Tabata et al. | 180/65.25 |
| 6,002,977 A | 12/1999 | Hirano et al. | |
| 6,174,262 B1 | 1/2001 | Ohta et al. | |
| 6,299,560 B1 | 10/2001 | Fujioka et al. | |
| 6,432,025 B1 | 8/2002 | Kondo et al. | |
| 6,464,610 B1 | 10/2002 | Hisano et al. | |
| 6,556,910 B2 | 4/2003 | Suzuki et al. | |
| 6,634,991 B2 | 10/2003 | Itou et al. | |
| 6,656,075 B2 | 12/2003 | Park et al. | |

(Continued)

FOREIGN PATENT DOCUMENTS
DE            41 38 080 A1      5/1992
(Continued)

OTHER PUBLICATIONS

Oct. 13, 2010 Search Report issued in European Patent Application No. 07254743.3.

(Continued)

*Primary Examiner* — Khoi Tran
*Assistant Examiner* — Bhavesh V Amin
(74) *Attorney, Agent, or Firm* — Oliff & Berridge, PLC

(57) ABSTRACT

In a control apparatus for a powertrain that includes an automatic transmission, occurrence of slip in a one-way clutch is determined when one gear is formed if a first rotation member and a second rotation member of the one-way clutch rotate relatively. If slip in the one-way clutch is detected, it is determined whether the rotational speed difference between the first rotation member and the second rotation member has increased. If the rotational speed difference between the first rotation member and the second rotation member has increased when slip is detected in the one-way clutch, a control is executed to engage a predetermined frictional engagement element.

15 Claims, 8 Drawing Sheets

U.S. PATENT DOCUMENTS

| | | |
|---|---|---|
| 2002/0086762 A1 | 7/2002 | Park et al. |
| 2007/0082785 A1* | 4/2007 | Fukushiro et al. ............ 477/115 |
| 2007/0142991 A1 | 6/2007 | Kawamura et al. |

FOREIGN PATENT DOCUMENTS

| | | |
|---|---|---|
| EP | 1 878 949 A1 | 1/2008 |
| JP | A 5-1589 | 1/1993 |
| JP | A 05-209676 | 8/1993 |
| JP | A 06-034032 | 2/1994 |
| JP | H8-178041 | 12/1994 |
| JP | A 8-178041 | 7/1996 |
| JP | A 09-264407 | 10/1997 |
| JP | H10-169772 | 6/1998 |
| JP | 2000-118266 | 10/1998 |
| JP | 2000-313251 | 4/1999 |
| JP | A 2000-118266 | 4/2000 |
| JP | A-2000-120859 | 4/2000 |
| JP | A 2000-313251 | 11/2000 |
| JP | A-2001-116125 | 4/2001 |
| JP | A 2002-089703 | 3/2002 |
| JP | A-2002-213588 | 7/2002 |
| JP | 2005-147238 | 11/2003 |
| JP | 2006-292136 | 4/2005 |
| JP | A-2005-90645 | 4/2005 |
| JP | A 2005-147238 | 6/2005 |
| JP | A 2006-292136 | 10/2006 |
| WO | WO 2007/029585 | 3/2007 |

OTHER PUBLICATIONS

European Search Report issued Mar. 14, 2011 in European Patent Application No. 07254743.3.
Office Action mailed Mar. 31, 2011 in U.S. Appl. No. 11/997,381.
Jul. 18, 2006 International Search Report for PCT Application No. PCT/JP2006/308263.
Office Action issued on Sep. 16, 2010 in U.S. Appl. No. 11/910,583.
Search Report dated Jun. 21, 2011 issued in European Patent Application No., 06732121.6-2421.

* cited by examiner

POWERTRAIN CONTROL APPARATUS AND METHOD, AND PROGRAM FOR IMPLEMENTING THE CONTROL METHOD

INCORPORATION BY REFERENCE

The disclosure of Japanese Patent Application No. 2006-348218 filed on Dec. 25, 2006 including the specification, drawings and abstract is incorporated herein by reference in its entirety.

BACKGROUND OF THE INVENTION

1. Field of the Invention

The present invention relates to a control apparatus and method for a powertrain, and a program that implements the control method. In particular, the invention relates to a for controlling a powertrain that includes an automatic transmission wherein one gear is formed by engaging a one-way clutch and another gear than the one gear is formed by engaging a predetermined frictional engagement element.

2. Background of the Invention

In a conventional automatic transmission, the gears are automatically formed in accordance with the vehicle speed. The automatic transmission has a plurality of frictional engagement elements and forms gears in accordance with combination of frictional engagement elements to be engaged.

In such an automatic transmission, the gears are shifted by selectively engaging and disengaging frictional engagement elements as appropriate. When the gear shift operation is performed, if the timing of engaging the frictional engagement elements is not properly matched with timing of disengaging other frictional engagement elements, shock may be generated. Therefore, a one-way clutch replaces the frictional engagement elements in a gear at which shock generally increases.

However, when forming a gear by using a one-way clutch, there occurs a slip in which an inner race and an outer race of the one-way clutch rotate relatively when a vehicle is not driven. Thereafter, when the vehicle is driven, the one-way clutch is abruptly engaged. At this time, shock may be generated. To that end, there is suggested a technique that reduces shock by reducing an engine power when the one-way clutch shifts from the slip state to the engaged state.

Japanese Patent Application Publication No. 5-1589 (JP-A-5-1589) describes a controller of an automatic transmission for vehicle that attains a specific shift range by combining operational states of a friction engagement device and a one-way clutch. The controller includes a power-on-state determining unit that determines whether a vehicle is in a power-on-state; a specified period detection unit that detects whether the transmission is at a state within a predetermined period just before the one-way clutch is synchronized; and an engine power reducing unit that reduces the engine power regardless of the gear shift operation when the vehicle is in the power-on-state and it is detected that the transmission is at the state within the predetermined period just before the one-way clutch is synchronized.

In accordance with the controller described in JP-A-5-1589, the engine power is reduced when it is determined that the vehicle is in the power-on-state and it is detected that the one-way clutch enters the specified period just before synchronization. As a consequence, shock caused by the synchronization of the one-way clutch can be reduced regardless of the gear shift operation.

In the case of the controller described in JP-A-H5-1589, although the engine power is reduced, driving power is not transmitted to a wheel until the one-way clutch shifts from the slip state to the engaged state. Thus, a driver cannot attain the required acceleration. Moreover, even though it is possible to reduce the shock generated by the engagement of the one-way clutch, the generation of the shock cannot be prevented.

SUMMARY OF THE INVENTION

A first aspect of the invention relates to a control apparatus for a powertrain that includes an automatic transmission that forms one gear by engaging a one-way clutch and forms another gear than the one gear by engaging a predetermined frictional engagement element. The control apparatus includes, a slip detection unit that detects the occurrence of slip in the one-way clutch when the one gear is formed, wherein it is determined that slip occurs when a first rotation member and a second rotation member of the one-way clutch rotate relatively; an engagement condition determination unit that determines whether an engagement condition for engaging the predetermined frictional engagement element is satisfied when slip is detected in the one-way clutch, wherein the engagement condition is satisfied when the rotational speed difference between the first rotation member and the second rotation member increases; and an engagement control unit that engages the predetermined frictional engagement element if the engagement condition is satisfied when slip is detected in the one-way clutch.

A second aspect of the invention relates to a method for controlling a powertrain that includes an automatic transmission that forms one gear by engaging a one-way clutch and forms another gear than the one gear by engaging a predetermined frictional engagement element. The control method includes, detecting whether slip is occurring in the one-way clutch when the one gear is formed, wherein it is determined that slip is occurring when a first rotation member and a second rotation member of the one-way clutch rotate relative to each other; determining whether an engagement condition for engaging the predetermined frictional engagement element is satisfied when slip is detected in the one way clutch, wherein the engagement condition is satisfied when a rotational speed difference between the first rotation member and the second rotation member increases; and executing an engagement control to engage the predetermined frictional engagement element if the engagement condition is satisfied when slip is detected in the one way clutch.

According to the first and second aspects, when the accelerator is operated by the driver, for example, when the one-way clutch is slipping, it is possible to engage the one-way clutch while controlling the engaging force of the frictional engagement element. Accordingly, the vehicle can be quickly accelerated by transmitting the driving force through the frictional engagement element until the one-way clutch is engaged. Moreover, the shock can be reduced by loosely engaging the one-way clutch while using the engaging force of the frictional engagement element. As a result, the acceleration required by the driver can be obtained and, also, the shock can be reduced.

BRIEF DESCRIPTION OF THE DRAWINGS

The above and other features and advantages of the present invention will become apparent from the following description of example embodiments, given in conjunction with the accompanying drawings, in which.

DETAILED DESCRIPTION OF EMBODIMENTS

Figure 1:
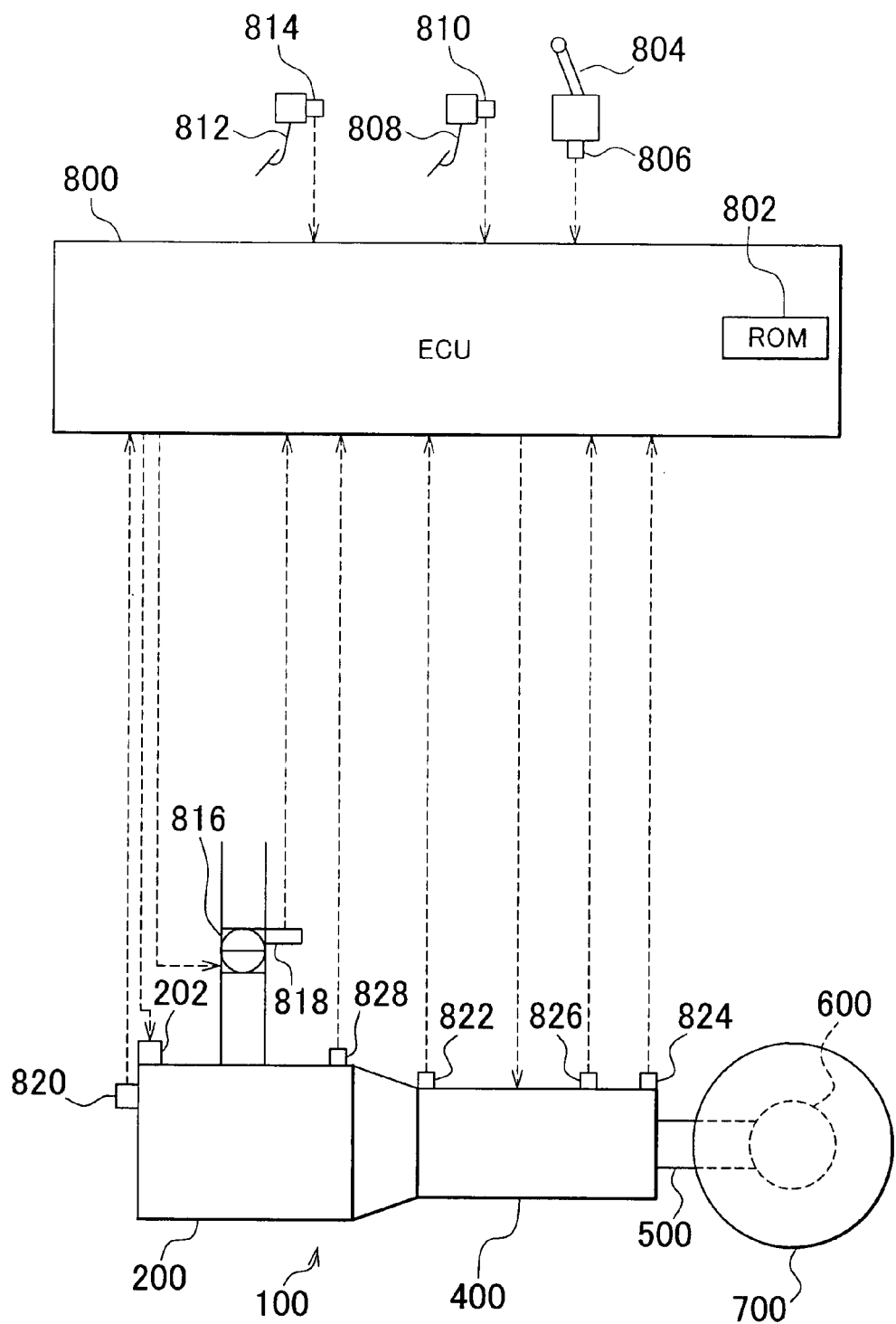
FIG. 1 shows a schematic block diagram of a hybrid vehicle equipped with an ECU that serves as a control apparatus in accordance with a first embodiment of the present invention.

Hereinafter, example embodiments of the present invention will be described in detail with reference to the accompanying drawings. In the following description, like parts are represented by like reference numerals. The like parts have like names and like functions. Therefore, redundant description thereof will be omitted.

A hybrid vehicle equipped with a control apparatus in accordance with a first embodiment of the present invention will be described with reference to FIG. 1. In this embodiment, the hybrid vehicle is an FR (front engine rear drive) vehicle, but it may be a vehicle other than the FR vehicle. Although the hybrid vehicle is described in this embodiment, there may be employed a vehicle having only an engine as a driving source.

The hybrid vehicle includes a hybrid system 100 serving as a driving source, an automatic transmission 400, a propeller shaft 500, a differential gear 600, rear wheels 700 and an ECU (electronic control unit) 800. The control apparatus of this embodiment may be implemented by executing a program stored in a ROM (read only memory) 802 of the ECU 800, for example. A powertrain of the hybrid vehicle includes the hybrid system 100 and the automatic transmission 400. The engine 200 of the hybrid system 100 is an internal combustion engine in which a mixture of air and fuel injected from an injector 202 is combusted in a combustion chamber of a cylinder. A piston in the cylinder is pushed down by the combustion to rotate a crankshaft.

The automatic transmission 400 is connected to an output shaft of the hybrid system 100. The power output from the automatic transmission 400 is transferred to left and right rear wheels 700 on both sides via the propeller shaft 500 and the differential gear 600.

A position switch 806 of a shift lever 804, an accelerator operation amount sensor 810 of an accelerator pedal 808, a depression force sensor 814 of a brake pedal 812, a throttle opening degree sensor 818 of an electric throttle valve 816, an engine speed sensor 820, an input shaft speed sensor 822, an output shaft speed sensor 824, an oil temperature sensor 826 and a coolant temperature sensor 828 are all connected to the ECU 800 via a harness or the like.

The position switch 806 detects the position of the shift lever 804 and transmits a signal indicating the detected shift lever position to the ECU 8000. Shifting of the automatic transmission 400 is automatically performed in accordance with the position of the shift lever 804.

The accelerator operation amount sensor 810 detects the operation amount of an accelerator pedal 808 and then transmits a signal that indicates the detected operation amount to the ECU 800. The depression force sensor 814 detects a stroke quantity of the brake pedal 812 (a force that is applied to the brake pedal 812 by the driver) and transmits a signal that indicates the detected force quantity to the ECU 800.

The throttle opening degree sensor 818 detects the opening degree of the electric throttle valve 816, which is controlled by an actuator, and transmits a signal that indicates the detected opening degree to the ECU 800. An amount of air inducted into the engine 200 (an output of the engine 200) is controlled by the electric throttle valve 816.

Moreover, instead of the electric throttle valve 816 or in addition thereto, an air intake valve or an air exhaust valve (both are not illustrated) may be provided, and the amount of air inducted into the engine 200 may be controlled by the lift or the duration of the air intake valve or the air exhaust valve.

The engine speed sensor 820 detects the rotational speed of the output shaft (crankshaft) of the engine 200 and transmits a signal that indicates the detected engine speed to the ECU 800. The input shaft speed sensor 822 detects a rotational speed NI of an input shaft of the automatic transmission 400 and transmits a signal that indicates the detected input shaft speed to the ECU 800. The output shaft speed sensor 824 detects a rotational speed NO of an output shaft of the automatic transmission 400 and transmits a signal that indicates the detected output shaft speed to the ECU 800.

The oil temperature sensor 826 detects a temperature of oil (ATF: automatic transmission fluid) to be used in an operation or a lubrication of the automatic transmission 400 and transmits a signal that indicates the detected temperature to the ECU 800.

The coolant temperature sensor 828 detects a temperature of the coolant in the engine 200 and transmits a signal that indicates the detected temperature to the ECU 800.

The ECU 800 controls various devices to optimize the vehicle traveling state based on maps and programs stored in the ROM 802 as well as the signals transmitted from the position switch 806, the accelerator operation amount sensor 810, the depression force sensor 814, the throttle opening degree sensor 818, the engine speed sensor 820, the input shaft speed sensor 822, the output shaft speed sensor 824, the oil temperature sensor 826, the coolant temperature sensor 828 and the like.

Figure 2:
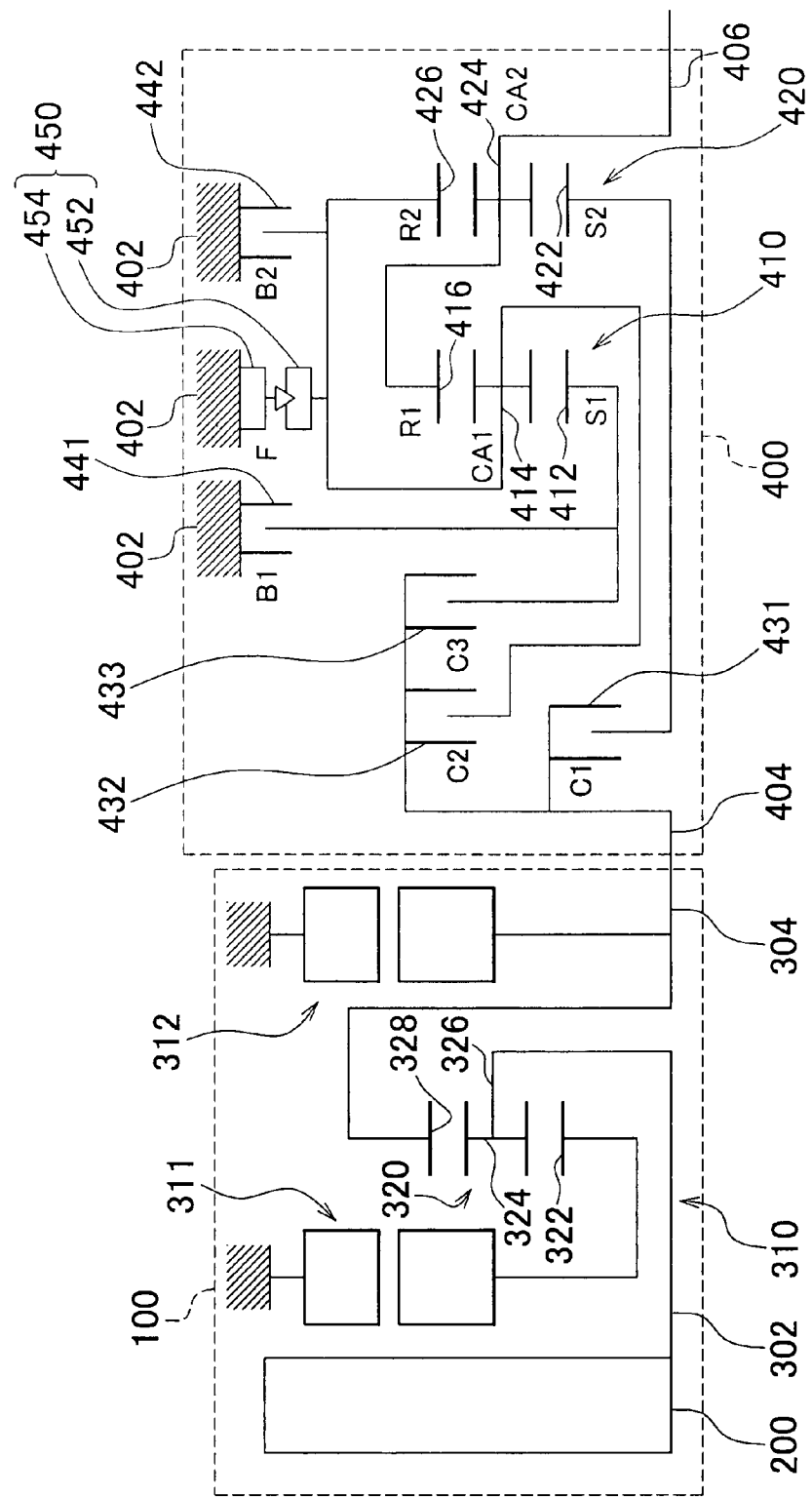
FIG. 2 illustrates a hybrid system and an automatic transmission.
Figure 3:
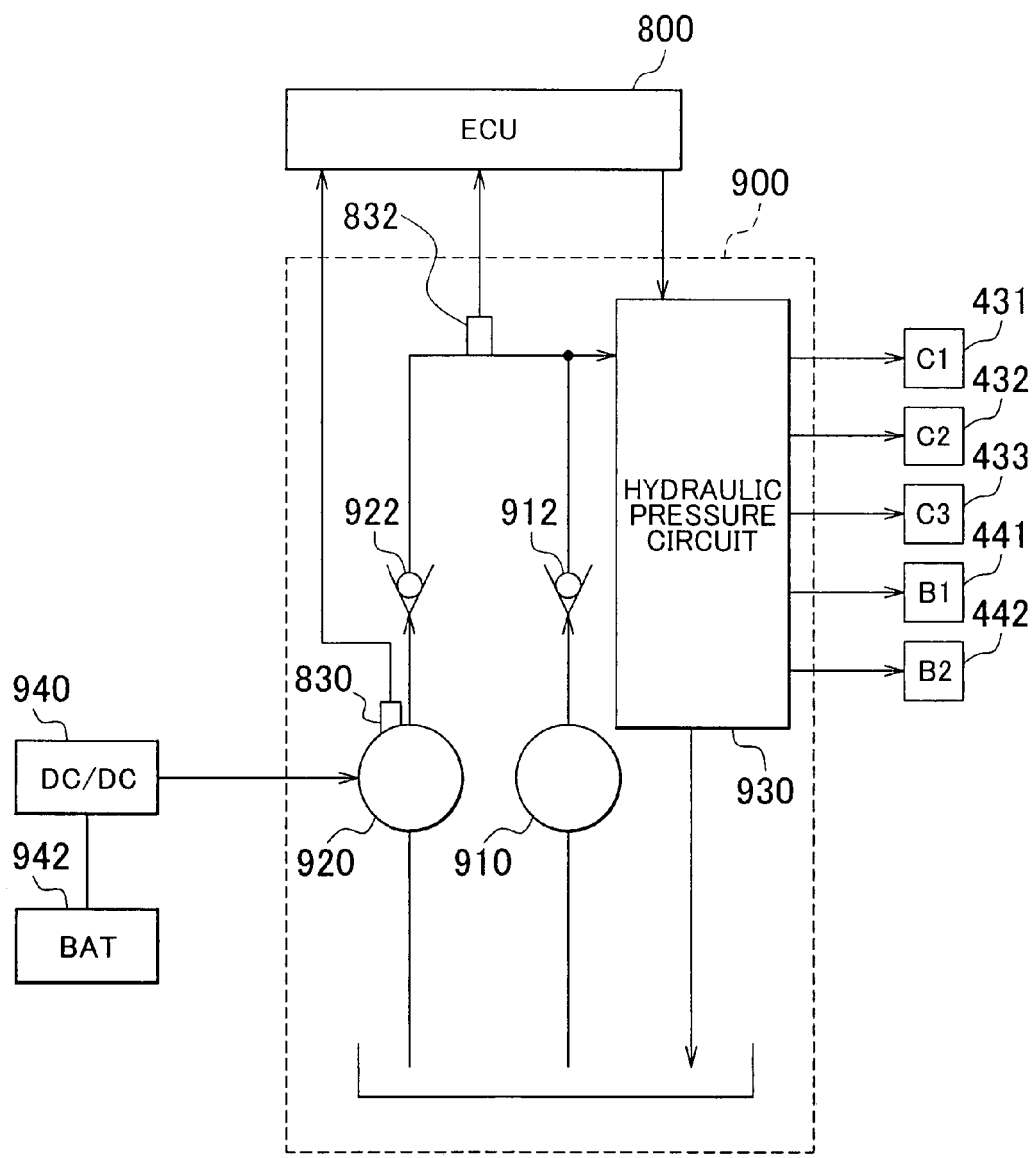
FIG. 3 describes a hydraulic control device.

Hereinafter, the hybrid system 100 and the automatic transmission 400 will be further described with reference to FIG. 2.

The hybrid system 100 has the engine 200, a power split mechanism 310, a first MG (motor generator) 311 and a second MG 312. The power split mechanism 310 distributes the power of the engine 200, which is input to an input shaft 302 to the first MG 311 and an output shaft 304. The power split mechanism 310 includes a planetary gear 320.

The planetary gear 320 has a sun gear 322, a pinion gear 324, a carrier 326 that holds the pinion gear 324 so that it can rotates on its axis and revolve, and a ring gear 328 engaged with the sun gear 322 through pinion gear 324.

In the power split mechanism 310, the carrier 326 is coupled to the input shaft 302, i.e., the engine 200. The sun gear 322 is coupled to the first MG 311. The ring gear 328 is coupled to the output shaft 304.

The power split mechanism 310 serves as a differential gear due to the relative rotation of the sun gear 322, the carrier 326 and the ring gear 328. The differential function of the power split mechanism 310 enables the power of the engine 200 to be distributed to the first MG 311 and the output shaft 304.

The first MG 311 produces electric power by using a part of the distributed power of the engine 200, or the second MG 312 is rotationally driven by using the electric power produced by the first MG 311. In this way, the power split mechanism 310 serves as a continuously variable transmission.

The first MG 311 and the second MG 312 are three-phase AC rotary electric machines. The first MG 311 is coupled to the sun gear 322 of the power split mechanism 310. The second MG 312 is provided so that a rotor thereof rotates together with the output shaft 304. Further, the second MG 312 may be located anywhere on the power transmission path between the output shaft 304 and the rear wheels 700.

The first MG 311 and the second MG 312 are controlled so that the target output torque of the automatic transmission 400 and optimal fuel efficiency can be achieved, the target output torque is calculated based on the accelerator operation amount, vehicle speed and the like, for example.

The automatic transmission 400 has an input shaft 404 that serves as an input rotation member and an output shaft 406 that serves as an output rotation member. Both the input shaft 404 and the output shaft 406 are provided on a common axis inside a casing 402, which serves as a non-rotary member attached to a vehicle body.

Further, the automatic transmission 400 has five frictional engagement elements, i.e., a first single-pinion-type planetary gear 410, a second single-pinion-type planetary gear 420, a C1 clutch 431, a C2 clutch 432, a C3 clutch 433, a B1 brake 441 and a B2 brake 442.

Moreover, the automatic transmission 400 has a one-way clutch (F) 450. The one-way clutch (F) 450 allows an inner race 452 and an outer race 454 to rotate relatively in only one direction but not in the opposite direction, i.e., relative rotation is restricted in the opposite direction. In this embodiment, the engagement of the one-way clutch (F) 450 indicates that the relative rotation of the inner race 452 and the outer race 454 is restricted.

The first planetary gear 410 has a sun gear (S1) 412, a carrier (CA1) 414 and a ring gear (R1) 416. The sun gear (S1) 412 is coupled to the input shaft 404 by engaging the C3 clutch 433. Further, the sun gear (S1) 412 is fixed to the casing 402 by engaging the B1 brake 441.

The carrier (CA1) 414 is coupled to the input shaft 404 by engaging the C2 clutch 432. Further, the carrier (CA1) 414 is fixed to the casing 402 by engaging the B2 brake 442 or the one-way clutch (F) 450. The ring gear (R1) 416 is coupled to the output shaft 406.

The second planetary gear 420 has a sun gear (S2) 422, a carrier (CA2) 424 and a ring gear (R2) 426. The sun gear (S2) 422 is coupled to the input shaft 404 by engaging the C1 clutch 431.

The carrier (CA2) 424 is coupled to the output shaft 406. The ring gear (R2) 426 is coupled to the carrier (CA1) 414 of the first planetary gear 410. Therefore, the ring gear (R2) 426 is fixed to the casing 402 by engaging the B2 brake 442 or the one-way clutch (F) 450.

By engaging the frictional engagement elements of the automatic transmission 400 in a predetermined arrangement, the automatic transmission 400 forms a required gear.

In this embodiment, when the vehicle is driven under power, a first gear is formed by engaging the C1 clutch 431 and engaging the one-way clutch (F) 450. Meanwhile, when the vehicle is when the vehicle is coasting, the first gear is formed by engaging the C1 clutch 431 and the B2 brake 442.

A second gear is formed by engaging the C1 clutch 431 and the B1 brake 441. A third gear is formed by engaging the C1 clutch 431 and the C2 clutch 432. A gear shifting operation in the automatic transmission 400 is performed based on a shift diagram, for example.

The C1 clutch 431, the C2 clutch 432, the C3 clutch 433, the B1 brake 441 and the B2 brake 442 are driven by hydraulic pressure. In this embodiment, the hybrid vehicle is equipped with a hydraulic pressure control device 900 that controls the engagement or release of the frictional engagement elements by applying or releasing the hydraulic pressure thereto or therefrom.

The hydraulic pressure control device 900 has a mechanical oil pump 910, an electric oil pump 920 and a hydraulic pressure circuit 930. The hydraulic pressure circuit 930 regulates the hydraulic pressure generated by the oil pumps 910 and 920 to a line pressure, to apply or release the hydraulic pressure regulated by assuming the line pressure as an initial pressure to or from the frictional engagement elements, and to supply oil for lubrication to an appropriate portion.

The mechanical oil pump 910 is driven by the engine 200 to generate hydraulic pressure. The mechanical oil pump 910 is arranged coaxially with the carrier 326, and operates upon receiving torque from the engine 200. In other words, the mechanical oil pump 910 is driven by the rotation of the carrier 326 to generate hydraulic pressure.

Meanwhile, the electric oil pump 920 is a pump driven by a motor (not shown). The electric oil pump 920 is attached to an appropriate portion such as the exterior of the casing 402 or the like. Moreover, the ECU 800 controls the electric oil pump 920 so that a desired hydraulic pressure is generated. For example, the rotational speed of the electric oil pump 920 is feedback controlled.

The rotational speed of the electric oil pump 920 is detected by a rotational speed sensor 830, and a signal that indicates the detected rotational speed is transmitted to the ECU 800. Further, a discharge pressure of the electric oil pump 920 is detected by a hydraulic pressure sensor 832, and a signal that indicates the detected discharge pressure is transmitted to the ECU 800. The electric oil pump 920 is operated by power supplied from a battery 942 via a DC/DC converter 940.

The hydraulic circuit 930 includes a plurality of solenoid valves, change-over valves or pressure regulator valves (all are not shown), and electrically controls the pressure regulation or the application of the hydraulic pressure. The control is executed by the ECU 800.

On a discharge side of each of the oil pumps 910 and 920 are check valve 912 and 922 that open by a discharge pressure of each of the oil pumps 910 and 920 and that are not opened when a pressure is applied in the opposite direction. The oil pumps 910 and 920 are connected in parallel to each other with respect to the hydraulic circuit 930. In addition, a line pressure regulation valve (not shown) controls the line pressure to two states: one state where a discharge amount is increased to increase the line pressure; and the other state where the discharge amount is decreased to reduce the line pressure.

Figure 4:
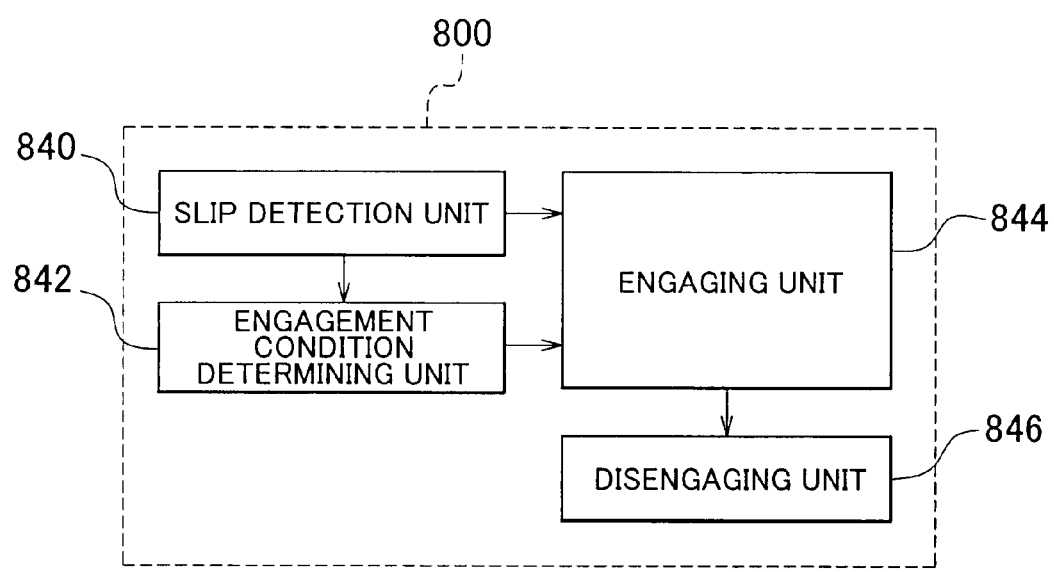
FIG. 4 presents a function block diagram of the ECU according to the first embodiment of the present invention.

Hereinafter, functions of the ECU 800 will be described with reference to FIG. 4. The following functions of the ECU 800 can be realized either by hardware or by software.

The ECU 800 includes a slip detection unit 840, an engagement condition determining unit 842, an engaging unit 844 and a disengaging unit 846. The slip detection unit 840 detects slip in the one-way clutch (F) 450 (i.e., slip between the inner race 452 and the outer race 454 of the one-way clutch (F) 450) that may occur when the C1 clutch 431 and the one-way clutch (F) 450 are engaged to form the first gear.

For example, the slip in the one-way clutch (F) 450 is detected when the rotational speed NI of the input shaft, which is detected by the input shaft speed sensor 822, is smaller than an estimated rotational speed of the input shaft, which is calculated by multiplying the rotational speed NO of the output shaft of the automatic transmission 400 by the gear ratio of the automatic transmission 400 in forming the first gear. The slip in the one-way clutch (F) 450 can also be detected in a different manner.

When the slip is detected, the engagement condition determining unit 842 determines whether a predetermined engagement condition is satisfied as a result of the increase in the difference in rotational speed between the inner race 452 and the outer race 454 of the one-way clutch (F) 450. The engagement condition is satisfied when a slip amount of the B1 brake 441 is smaller than or equal to a threshold value A, for example.

Whether the condition in which the slip amount of the B1 brake 441 is smaller than or equal to the threshold value A is satisfied is determined by whether a condition in which a difference between the rotational speed NI of the input shaft which is detected by the input shaft speed sensor 822 and a synchronous rotational speed is smaller than or equal to a threshold value B is satisfied, the synchronous rotational speed being calculated by multiplying the rotational speed NO of the output shaft of the automatic transmission 400 by a gear ratio of the automatic transmission 400 in forming the second gear.

Therefore, the engagement condition may also be satisfied when the difference between the rotational speed NI of the input shaft, which is detected by the input shaft speed sensor 822, and the synchronous rotational speed of the second gear is smaller than or equal to the threshold value B.

When the slip is detected and it is determined that the engagement condition is satisfied, the engaging unit 844 engages the B1 brake 441 as well as the C1 clutch 431. By engaging the B1 brake 441 as well as the C1 clutch 431, the second gear is formed. Accordingly, the second gear is formed by engaging the B1 brake 441 without using a shift diagram used in general gear shifting.

After the B1 brake 441 is engaged, if the driver operates the accelerator (the accelerator pedal 808), the disengaging unit 846 disengages the B1 brake 441 by gradually reducing engaging force thereof. The engaging force of the B1 brake 441 may be controlled in the same manner as that used for a power-on downshift from the second gear to the first gear, for example.

Figure 5:
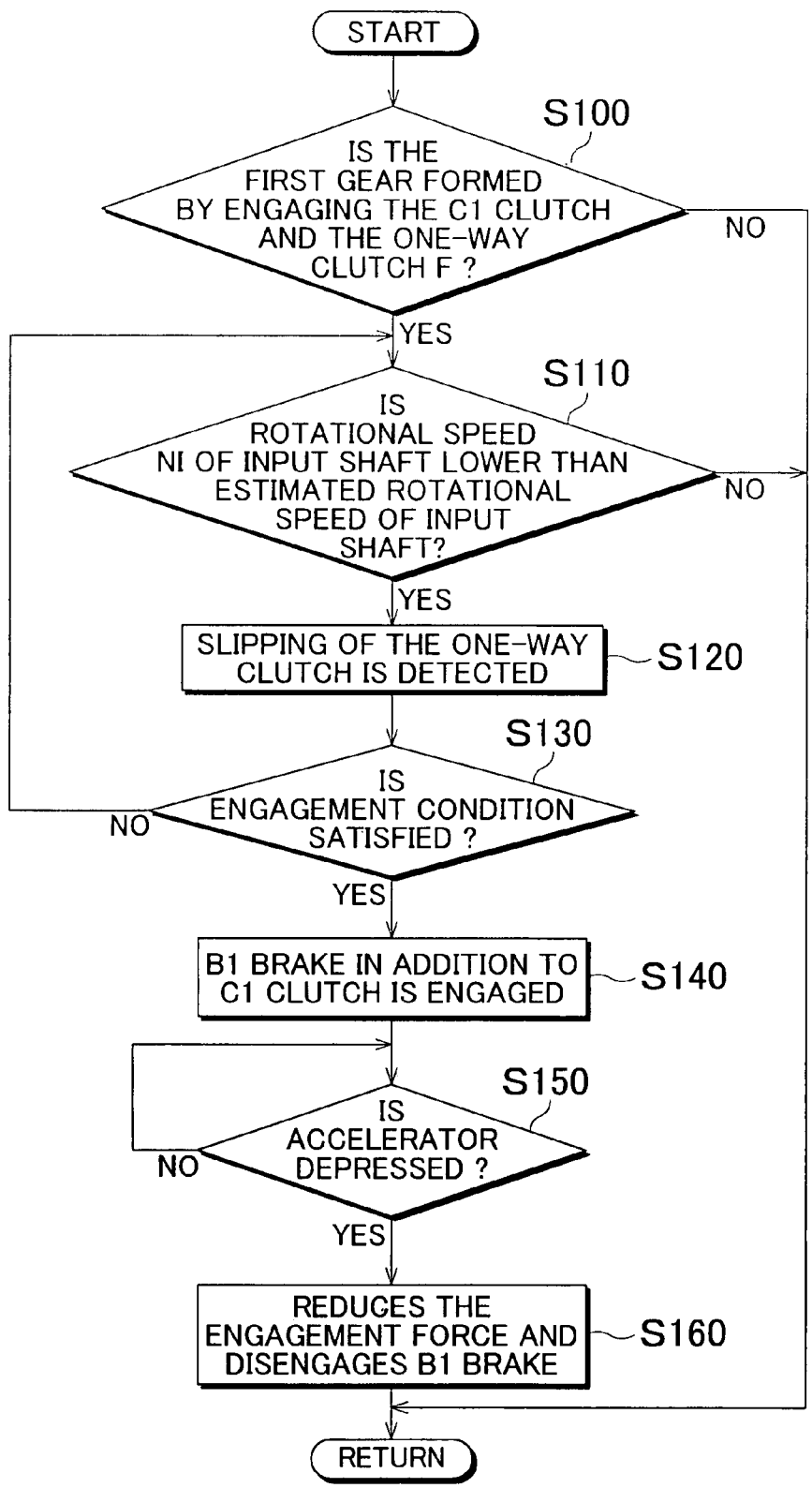
FIG. 5 represents a flowchart illustrating a control structure of a program executed by the ECU of the first embodiment of the present invention.

Hereinafter, a control structure of a program executed by the ECU 800 will be described with reference to FIG. 5. The following program is repeated at a predetermined interval.

In step S100, the ECU 800 determines whether the first gear is formed by engaging the C1 clutch 431 and engaging the one-way clutch (F) 450. Because the ECU 800 itself determines whether the first gear is formed by engaging the C1 clutch 431 and engaging the one-way clutch (F) 450, it is determined inside the ECU 800 whether the C1 clutch 431 and the one-way clutch (F) 450 are engaged to form the first gear.

If it is determined that both the C1 clutch 431 and the one-way clutch (F) 450 are engaged to form the first gear (YES in step S100), the operation proceeds to step S110. Otherwise (NO in step S100), the process is completed.

In step S110, the ECU 800 determines whether the rotational speed NI of the input shaft is lower than the estimated rotational speed of the input shaft, which is calculated by multiplying the rotational speed NO of the output shaft of the automatic transmission 400 by a gear ratio of the automatic transmission 400 that forms the first gear.

If the rotational speed NI of the input shaft is lower than the estimated rotational speed of the input shaft (YES in step S110), the operation proceeds to step S120. Otherwise (NO in step S110), the operation ends. In S120, the ECU 800 determines an occurrence of the slip in the one-way clutch (F) 450 in which the inner race 452 and the outer race 454 of the one-way clutch (F) 450 rotate relatively.

In step S130, the ECU 800 determines whether an engagement condition is satisfied by an increase in rotational speed difference between the inner race 452 and the outer race 454 of the one-way clutch (F) 450.

If the engagement condition is satisfied (YES in step S130), the operation proceeds to step S140. Otherwise (NO in step S130), the operation returns to step S110. In step S140, the ECU 800 engages the B1 brake 441 in addition to the C1 clutch 431.

In step S150, the ECU 800 determines whether the accelerator is depressed based on a signal transmitted from the accelerator operation amount sensor 810. If it is determined that the accelerator is depressed (YES in step S150), the operation proceeds to step S160. Otherwise (NO in step S150), the operation returns to step S150. In step S160, the ECU 800 reduces the engagement force and disengages the B1 brake 441. Then, the operation ends.

Hereinafter, an operation of the ECU 800, which serves as the control apparatus in accordance with the present embodiment, will be described based on the above described structure and flowchart.

Figure 6:
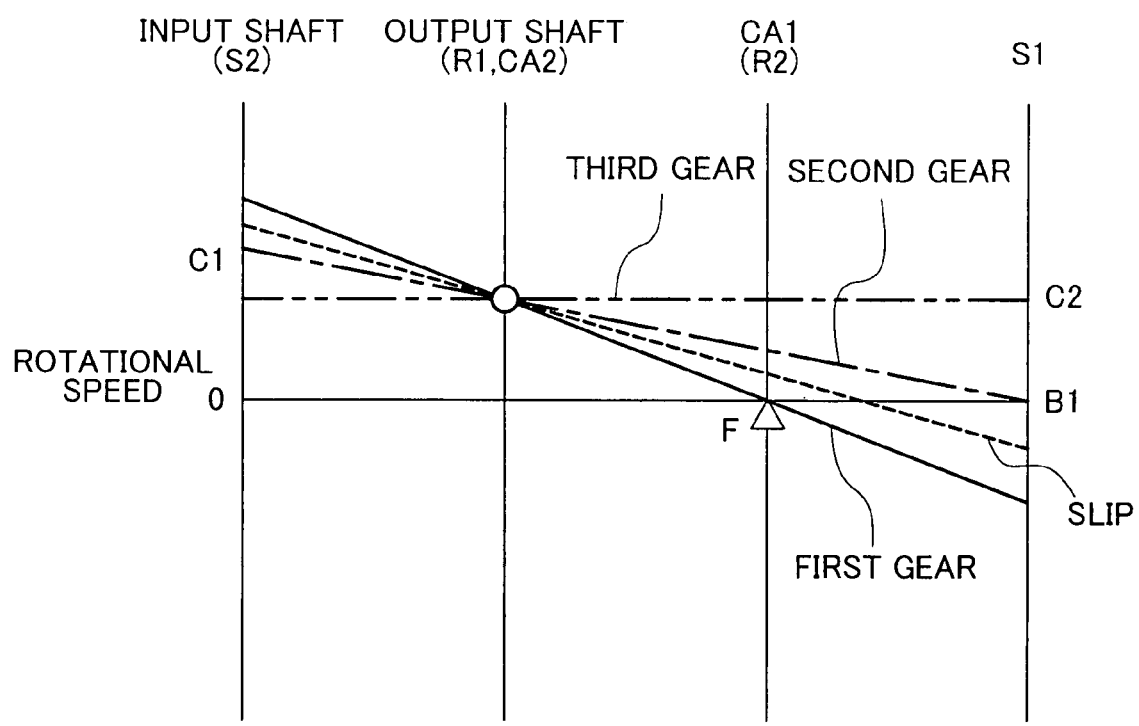
FIG. 6 describes a collinear diagram of the automatic transmission.

When the vehicle is in motion, if it is determined that the C1 clutch 431 and the one-way clutch (F) 450 are engaged to form the first gear (YES in step S100), the rotational speeds of the input shaft 404 and the output shaft 406 of the automatic transmission 400 and those of the carrier (CA1) 414 and the sun gear (S1) 412 of the first planetary gear 410 satisfy a relationship indicated by a solid line in the collinear diagram of FIG. 6.

In that state, if the driver stop to operate the accelerator pedal, and the hybrid vehicle is not driven by the driving force of the driving source, the rotational speed NO of the output shaft is maintained, while the rotational speed NI of the input shaft decreases, as indicated by a dotted line of FIG. 6. Accordingly, the rotational speed NI of the input shaft falls below the estimated rotational speed of the input shaft (YES in step S110).

In this case, the rotational speed of the carrier (CA1) 414 of the first planetary gear 410 increases, so that the inner race 452 and the outer race 454 of the one-way clutch (F) 450 rotate relatively. That is, the one-way clutch (F) 450 slips, and the slipping of the one-way clutch (F) 450 is detected (S120).

If the rotational speed of the input shaft increases by the depression of the accelerator when the one-way clutch (F) 450 is slipping, the rotational speed of the carrier (CA1) 414 of the first planetary gear 410 decreases until the one-way clutch (F) 450 is engaged.

Meanwhile, until the one-way clutch (F) 450 is engaged, the driving power is not transmitted to the drive wheels (i.e., the real wheels 700). Therefore, the hybrid vehicle is accelerated later than the operation timing of the accelerator by the driver. As a consequence, even if the driver depressed the accelerator the required acceleration may not be provided. Further, shock may be generated when the one-way clutch (F) 450 is engaged.

Thus, in this embodiment, if the engagement condition is satisfied (YES in step S130) by the increase in rotational speed difference between the inner race 452 and the outer race 454 of the one-way clutch (F) 450, as indicated by a dashed dotted line of FIG. 6, the B1 brake 441 in addition to the C1 clutch 431 are engaged (S140).

Accordingly, the second gear can be formed. Thereafter, if the accelerator is depressed (YES in step S150), the engagement force of the B1 brake 441 is reduced, and the B1 brake 441 is disengaged (S160).

Therefore, if the accelerator is depressed when the one-way clutch (F) 450 is slipping, it is possible to engage the one-way clutch (F) 450 while controlling the engagement force of the B1 brake 441. Accordingly, the hybrid vehicle may be quickly accelerated by transmitting the driving force using the B1 brake 441 until the one-way clutch (F) 450 is engaged. Moreover, the shock can be reduced by loosely engaging the one-way clutch (F) 450 while using the engagement force of the B1 brake 441. As a result, the acceleration required by the driver can be obtained and, also, the shock can be reduced.

As set forth above, if the ECU determines that the engagement condition is satisfied by the increase in the rotational speed difference between the inner race and the outer race when slip is detected in the one-way clutch F, the B1 brake in addition to the C1 clutch are engaged, thereby forming the second gear. After the B1 brake is engaged, if the accelerator is depressed, the engaging force of the B1 brake is reduced. Therefore, when the accelerator is depressed, it is possible to engage the one-way clutch F while controlling the engagement force of the B1 brake. Accordingly, the hybrid vehicle may be quickly accelerated by transmitting the driving force by the B1 brake until the one-way clutch F is engaged. Moreover, the shock can be reduced by loosely engaging the one-way clutch F while using the engaging force of the B1 brake. As a result, the acceleration required by the driver can be obtained and, also, the shock can be reduced.

Although the B1 brake 441 in addition to the C1 clutch 431 are engaged in this embodiment, the C2 clutch 432, for example, may be engaged or disengaged instead of the B1 brake 441.

In the event of the above condition, the condition in which the slip amount of the C2 clutch 432 is smaller than or equal to a threshold value C and the condition in which the difference between the rotational speed NO of the input shaft, which is detected by the input shaft speed sensor 822, and the synchronous rotational speed, calculated by multiplying the rotational speed NO of the output shaft by a gear ratio of the automatic transmission 400 in forming a third gear, is smaller than or equal to a threshold value D may be used as the engagement conditions. Accordingly, the third gear can be formed as indicated by a dashed double-dotted line of FIG. 6.

Hereinafter, a second embodiment of the present invention will be described. The second embodiment differs from the first embodiment in that when the slip is detected in the one-way clutch (F) 450, the hybrid system 100 is controlled to increase the rotational speed difference between the inner race 452 and the outer race 454 of the one-way clutch (F) 450.

Because the second embodiment is identical to the first embodiment in other structures and functions thereof, redundant descriptions thereof will be omitted.

Figure 7:
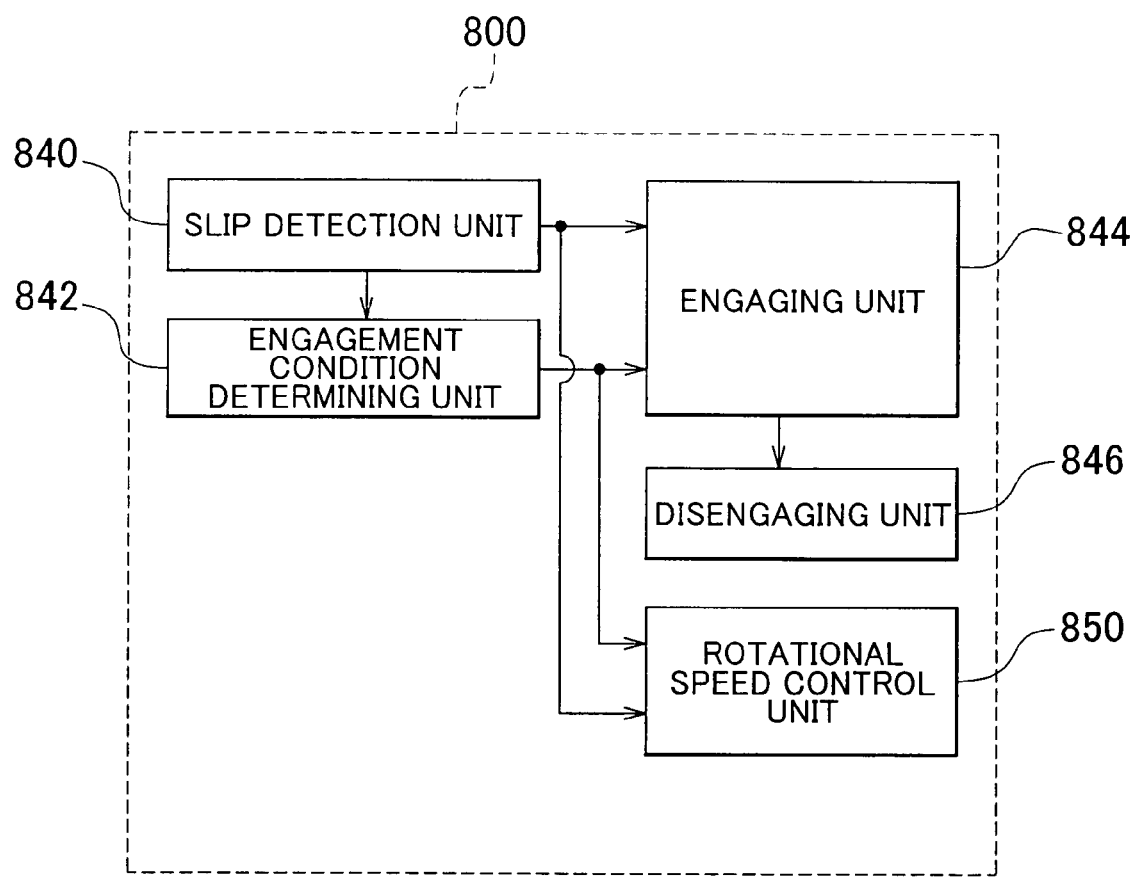
FIG. 7 provides a function block diagram of an ECU in accordance with a second embodiment of the present invention.

Hereinafter, functions of the ECU 800, which serves as the control apparatus in accordance with this embodiment, will be described with reference to FIG. 7. The following functions of the ECU 800 may be implemented either by hardware or by software. Moreover, the same parts as those of the first embodiment are designated by like reference numerals, and redundant descriptions thereon will be omitted.

The ECU 800 includes a rotational speed control unit 850 in addition to the slip detection unit 840, the engagement condition determining unit 842, the engaging unit 844 and the disengaging unit 846.

If it is determined that the engagement condition is not satisfied when slip is detected in the one-way clutch (F) 450, the rotational speed control unit 850 controls the hybrid system 100 serving as a driving source to decrease the rotational speed NI of the input shaft of the automatic transmission 400.

Figure 8:
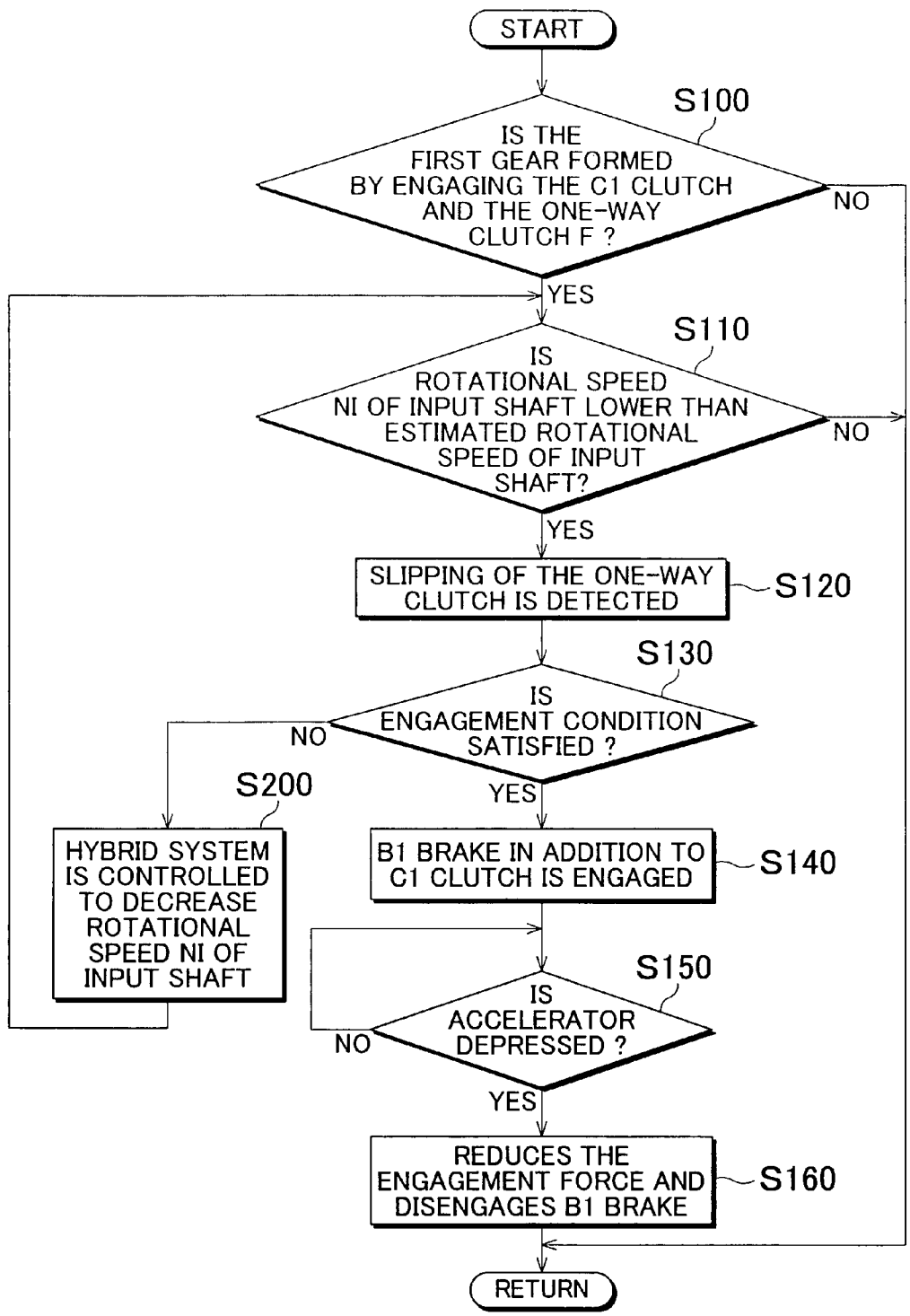
FIG. 8 depicts a flow chart showing a control structure of a program executed by the ECU in accordance with the second embodiment of the present invention.

Hereinafter, a control structure of a program executed by the ECU 800 will be described with reference to FIG. 8. The following program is repeated at a predetermined interval. Further, the same step numbers as those of the first embodiment represent the same processes, and redundant descriptions thereof will be omitted.

In step S200, the hybrid system 100 is controlled to decrease the rotational speed of the input shaft of the automatic transmission 400, i.e., the rotational speed of the output shaft of the hybrid system 100.

Hereinafter, an operation of the ECU 800 will be described based on the above-described structure and flowchart.

If it is determined that the engagement condition is not satisfied (NO in step S130) when slip is detected in the one-way clutch (F) 450 (S120), the hybrid system 100 is controlled to decrease the rotational speed NI of the input shaft of the automatic transmission 400, i.e., the rotational speed of the output shaft of the hybrid system 100.

Thus, the rotational speed difference between the inner race 452 and the outer race 454 of the one-way clutch (F) 450 can be increased and, hence, the engaged state of the frictional engagement elements can be quickly satisfied. As a result, the B1 brake 441 or the C2 clutch 432 can be easily engaged before the accelerator is depressed again.

As set forth above, if the ECU determines that the engagement condition is not satisfied when slip is detected in the one-way clutch (F) 450, the hybrid system 100 is controlled to decrease the rotational speed of the input shaft of the automatic transmission. Therefore, the rotational speed difference between the inner race and the outer race of the one-way clutch F is increased and, hence, the engaged state of the frictional engagement element can be quickly satisfied. As a result, the B1 brake or the C2 clutch may be easily engaged before the accelerator is depressed by the driver again.

While the invention has been shown and described with respect to the example embodiments, it will be understood by those skilled in the art that various changes and modification may be made without departing from the scope of the invention as defined in the following claims.

What is claimed is:

1. A control apparatus for a powertrain that includes an automatic transmission that forms a first gear by engaging a one-way clutch and forms a second gear, in which a gear ratio is smaller than a gear ratio in the first gear, by engaging a predetermined frictional engagement element, the control apparatus comprising:

a slip detection unit that detects a slip state in which a first rotation member and a second rotation member of the one-way clutch rotate relative to each other, in a control state in which the first gear is formed;

an engagement condition determination unit that determines whether a predetermined condition for engaging the predetermined friction engagement element to form the second gear is satisfied by an increase in a rotational speed difference between the first rotation member and the second rotation member, when the slip state is detected; and an engagement control unit that engages the predetermined frictional engagement element if it is determined that the condition is satisfied when the slip state is detected.

2. The control apparatus of claim 1, wherein the condition is a condition that a slip amount of the predetermined frictional engagement element is smaller than or equal to a predetermined value.

3. The control apparatus of claim 1, wherein the condition is a condition that a difference between a rotational speed of an input shaft of the automatic transmission and a synchronous rotational speed in the second gear is smaller than or equal to a predetermined value.

4. The control apparatus of claim 1, further comprising:
a rotational speed difference control unit that executes a control to increase the rotational speed difference between the first rotation member and the second rotation member if it is determined that the condition is not satisfied when the slip state is detected.

5. The control apparatus of claim 4, wherein the rotational speed difference control unit executes the control to increase the rotational speed difference between the first rotation member and the second rotation member by controlling a driving source coupled to the automatic transmission.

6. The control apparatus of claim 5, wherein the rotational speed difference control unit that executes the control to increase the rotational speed difference between the first rotation member and the second rotation member by controlling the driving source to decrease a rotational speed of an input shaft of the automatic transmission.

7. The control apparatus of claim 1, further comprising:
an engagement force reduction control unit that executes a control to reduce engagement force of the predetermined frictional engagement element if an accelerator is operated after the predetermined frictional engagement element is engaged.

8. A method for controlling a powertrain that includes an automatic transmission that forms a first gear by engaging a one-way clutch and forms a second gear, in which a gear ratio is smaller than a gear ratio in the first gear, by engaging a predetermined frictional engagement element, the control method comprising:
detecting a slip state in which a first rotation member and a second rotation member of the one-way clutch rotate relative to each other, in a control state in which the first gear is formed;

determining whether a predetermined condition for engaging the predetermined frictional engagement element to form the second gear is satisfied by an increase in a rotational speed difference between the first rotation member and the second rotation member, when the slip state is detected; and executing a control to engage the predetermined frictional engagement element if it is determined that the condition is satisfied when the slip state is detected.

9. The method according to claim 8, wherein the condition is a condition that a slip amount of the predetermined frictional engagement element is smaller than or equal to a predetermined value.

10. The method according to claim 8, wherein the condition is a condition that a difference between a rotational speed of an input shaft of the automatic transmission and a synchronous rotational speed in the second gear is smaller than or equal to a predetermined value.

11. The method according to claim 8, further comprising:
executing a control to increase a rotational speed difference between the first rotation member and the second rotation member if it is determined that the condition is not satisfied when the slip is detected.

12. The method according to claim 11, wherein the rotational speed difference between the first rotation member and the second rotation member is increased by controlling a driving source coupled to the automatic transmission.

13. The method according to claim 12, wherein the rotational speed difference between the first rotation member and the second rotation member is increased by controlling the driving source to decrease a rotational speed of an input shaft of the automatic transmission.

14. The method according to claim 8, further comprising:
executing a control to reduce engagement force of the predetermined frictional engagement element if an accelerator is operated after the predetermined frictional engagement element is engaged.

15. A computer readable storage medium that stores a program that executes in a computer the control method described in claim 8.

* * * * *